US010253663B2

(12) United States Patent
Matsui et al.

(10) Patent No.: US 10,253,663 B2
(45) Date of Patent: Apr. 9, 2019

(54) ENGINE DEVICE

(71) Applicant: Yanmar Co., Ltd., Osaka-shi, Osaka-fu (JP)

(72) Inventors: Yu Matsui, Osaka (JP); Kunihiko Habuchi, Osaka (JP); Takeshi Bandoh, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 15/569,065

(22) PCT Filed: Apr. 14, 2016

(86) PCT No.: PCT/JP2016/062033
§ 371 (c)(1),
(2) Date: Oct. 24, 2017

(87) PCT Pub. No.: WO2016/175039
PCT Pub. Date: Nov. 3, 2016

(65) Prior Publication Data
US 2018/0135479 A1    May 17, 2018

(30) Foreign Application Priority Data

Apr. 27, 2015 (JP) .................................. 2015-090657

(51) Int. Cl.
*F01M 13/04* (2006.01)
*F01M 13/00* (2006.01)
(Continued)

(52) U.S. Cl.
CPC ............ *F01M 13/04* (2013.01); *F01M 13/00* (2013.01); *F02M 25/06* (2013.01);
(Continued)

(58) Field of Classification Search
CPC ........ F01M 13/04; F01M 13/00; F02M 25/06; F02M 35/10118; F02M 35/10124; F02M 35/10222; F02M 35/10268
(Continued)

(56) References Cited

U.S. PATENT DOCUMENTS 6,058,917 A * 5/2000 Knowles ................. F01M 13/04
123/573
7,299,787 B2 * 11/2007 Sasaki ..................... F02M 25/06
123/184.35
2012/0138030 A1    6/2012 Yang

FOREIGN PATENT DOCUMENTS

JP  91-194713 U1   12/1986
JP  02-146210 A    6/1990
(Continued)

OTHER PUBLICATIONS

International Search Report dated Jun. 28, 2016 issued in corresponding PCT Application PCT/US2016/062033.

*Primary Examiner* — Syed O Hasan
(74) *Attorney, Agent, or Firm* — Norton Rose Fulbright US LLP

(57) ABSTRACT

To provide an engine device with high reliability and high safety in which a pipe conduit in a portion where a blow-by gas having leaked from a combustion chamber is merged with intake air (outdoor air) is not blocked with ice coating even in use in a cold region, especially an arctic region at −20° C. or less, a blow-by gas mixed joint configured to introduce a blow-by gas flowing in a returning hose to an intake pipe includes a blow-by gas guide plate that defines introduction space expanding upstream and downstream of a blow-by gas inlet in an intake direction of an intake passage. The blow-by gas guide plate closes an upstream end of a part of the introduction space expanding upstream of a blow-by gas inlet and opens a downstream end of a part
(Continued)

of the introduction space expanding downward of the blow-by gas inlet in the intake passage.

20 Claims, 8 Drawing Sheets

(51) Int. Cl.
    *F02M 25/06*     (2016.01)
    *F02M 35/10*     (2006.01)

(52) U.S. Cl.
    CPC ............... *F02M 35/10118* (2013.01); *F02M 35/10124* (2013.01); *F02M 35/10222* (2013.01); *F02M 35/10268* (2013.01); *Y02T 10/121* (2013.01)

(58) Field of Classification Search
    USPC .................................................. 123/572, 573
    See application file for complete search history.

(56) References Cited

FOREIGN PATENT DOCUMENTS

| | | |
|---|---|---|
| JP | 04-107432 U | 9/1992 |
| JP | 2003-531330 A | 10/2003 |
| JP | 2013-133796 A | 7/2013 |
| JP | 2013-148010 A | 8/2013 |
| JP | 2013-167204 A | 8/2013 |

* cited by examiner

ENGINE DEVICE

CROSS REFERENCES TO RELATED APPLICATIONS

This application is a national stage application pursuant to 35 U.S.C. § 371 of International Application No. PCT/JP2016/062033, filed on Apr. 14, 2016, which claims priority under 35 U.S.C. § 119 to Japanese Patent Application No. 2015-090657, filed on Apr. 27, 2015, the disclosures of which are hereby incorporated by reference in their entireties.

TECHNICAL FIELD

The present disclosure relates to an engine device such as a diesel engine that is mounted as a power source in various types of power equipment such as working vehicles, agricultural machines, electric generators, and refrigerators, and particularly to an engine device including a blow-by gas returning mechanism that returns a blow-by gas to an intake system.

BACKGROUND ART

Exhaust emission regulation to engine devices serving as internal combustion engines has become more and more strict in recent years, and various measures have been proposed for engine devices in order to comply with exhaust emission regulation. As measures against exhaust gas in diesel engines or other machines to date, an exhaust gas recirculation (EGR) device for returning part of exhaust gas to an intake side is provided to reduce a combustion temperature and thereby reduce the amount of nitrogen oxide (NOx) in the exhaust gas. Specifically, the proposed devices include a configuration using an improved exhaust gas purifier for use in a diesel engine (see, for example, Patent Literatures 1: PTL 1) and a configuration in which the number of parts of a blow-by gas returning device is reduced in order to simplify a maintenance and inspection work (see, for example, Patent Literature 2: PTL 2), for example. Another proposed technique is that lubricating oil is separated from a blow-by gas that has leaked from a combustion chamber and the blow-by gas from which lubricating oil has been separated is returned to an intake system for recirculation.

CITATION LIST

Patent Literature

PTL 1: Japanese Patent Application Laid-Open No. 2013-133796
PTL 2: Japanese Patent Application Laid-Open No. 2013-148010

SUMMARY OF INVENTION

Technical Problem

In a configuration that returns a blow-by gas in a crank case that has leaked from a combustion chamber to an intake system, the blow-by gas contains moisture together with an oil component that is a lubricating oil, and thus, there arises a significant problem in use in cold regions, especially in arctic regions at −20° C. or less. In cold regions, especially arctic regions at −20° C. or less, there occurs a phenomenon that a blow-by gas is rapidly cooled in a portion where the blow-by gas is merged with intake air (outdoor air), and moisture contained in the blow-by gas is frozen to generate ice coating on a pipe conduit in which the blow-by gas flows. Consequently, the pipe conduit for the blow-by gas is blocked with ice, and the pressure in the crank case of the engine device increases so that lubricating oil therein leaks out, disadvantageously. In addition, the leakage of lubricating oil might cause a shortage of lubricating oil, resulting in damage of equipment (e.g., supercharger).

An aspect of the present disclosure is intended to solve the problems described above, and has an object of providing an engine device with high reliability and high safety in which a pipe conduit for a blow-by gas that has leaked from a combustion chamber, especially a pipe conduit in a portion where the blow-by gas is merged with intake air (outdoor air; fresh air), is not blocked with ice coating even in use in a cold region, especially an arctic region at −20° C. or less.

Solution to Problem

According to a first aspect of the present disclosure, an engine device having a blow-by gas returning mechanism that returns a blow-by gas having leaked from a combustion chamber to an intake pipe in which intake air flows, includes:

a returning hose in which the blow-by gas from the combustion chamber flows; and a blow-by gas mixed joint configured to introduce the blow-by gas flowing in the returning hose to the intake pipe, wherein the blow-by gas mixed joint includes an intake passage disposed on the intake pipe, a blow-by gas inlet configured to introduce the blow-by gas into the intake pipe, and a blow-by gas guide plate that guides the blow-by gas introduced from the blow-by gas inlet in the intake passage and that defines introduction space expanding upstream and downstream of the blow-by gas inlet in an intake direction of the intake passage, and the blow-by gas guide plate closes an upstream end of a part of the introduction space expanding upstream of the blow-by gas inlet, opens a downstream end of a part of the introduction space expanding downstream of the blow-by gas inlet in the intake passage, and guides the blow-by gas introduced from the blow-by gas inlet to a predetermined distance so that the blow-by gas is separated from intake air flowing in the intake passage and flows in parallel with the intake air.

Solution to Problem

According to an aspect of the present disclosure, it is possible to provide an engine device with high reliability and high safety in which a pipe conduit for a blow-by gas that has leaked from a combustion chamber, especially a portion where the blow-by gas is merged with intake air, is not blocked with ice even in cold regions, especially arctic regions at an outdoor temperature of −20° C. or less.

DESCRIPTION OF EMBODIMENTS

Figure 1:
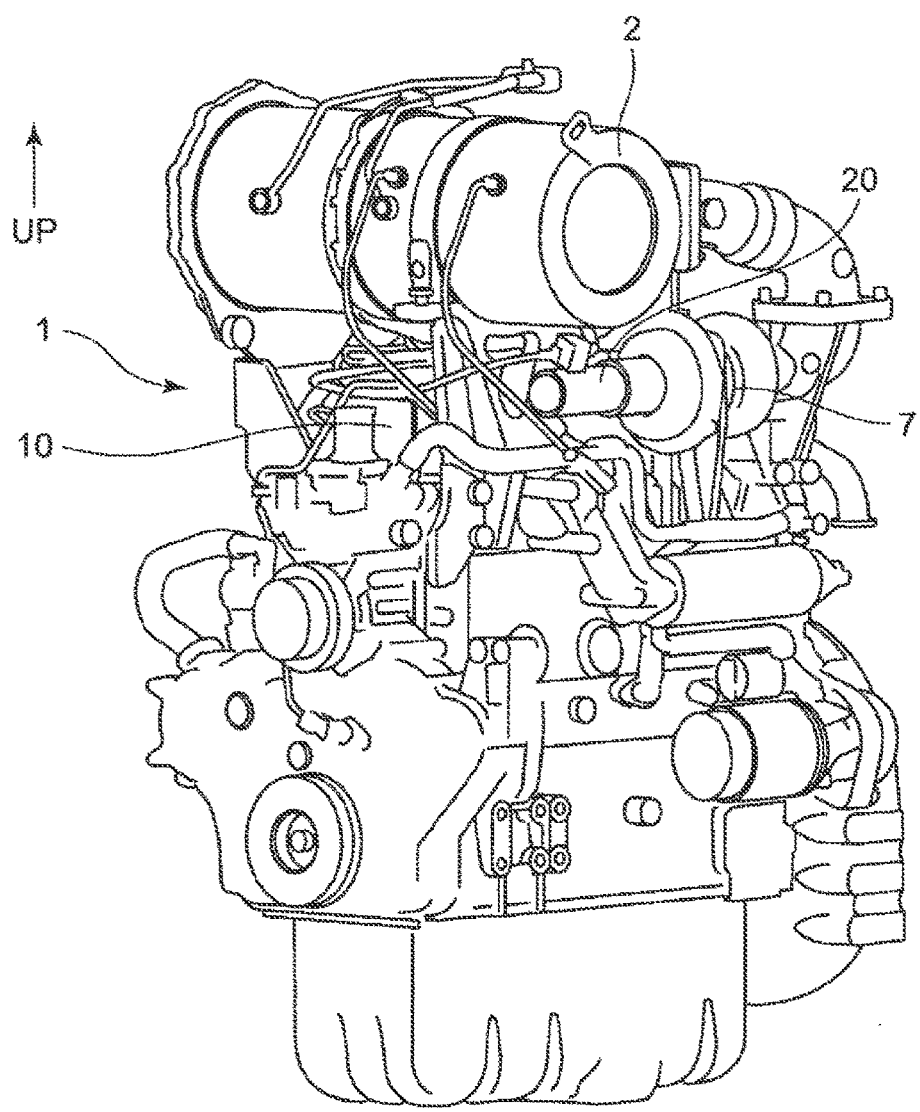
FIG. 1 illustrates a perspective view illustrating a diesel engine according to a first embodiment of the present disclosure.

According to a first aspect of the present disclosure, an engine device having a blow-by gas returning mechanism that returns a blow-by gas having leaked from a combustion chamber to an intake pipe in which intake air flows, includes:

a returning hose in which the blow-by gas from the combustion chamber flows; and a blow-by gas mixed joint configured to introduce the blow-by gas flowing in the returning hose to the intake pipe, wherein the blow-by gas mixed joint includes an intake passage disposed on the intake pipe, a blow-by gas inlet configured to introduce the blow-by gas into the intake pipe, and a blow-by gas guide plate that guides the blow-by gas introduced from the blow-by gas inlet in the intake passage and that defines introduction space expanding upstream and downstream of the blow-by gas inlet in an intake direction of the intake passage, and the blow-by gas guide plate closes an upstream end of a part of the introduction space expanding upstream of the blow-by gas inlet, opens a downstream end of a part of the introduction space expanding downstream of the blow-by gas inlet in the intake passage, and guides the blow-by gas introduced from the blow-by gas inlet to a predetermined distance so that the blow-by gas is separated from intake air flowing in the intake passage and flows in parallel with the intake air.

The engine device according to the first aspect of the present disclosure having the configuration described above can prevent a phenomenon in which a pipe conduit or the like in a portion where a blow-by gas that has leaked from a combustion chamber is merged with intake air (outdoor air) is blocked with ice coating even in use in a cold region, especially an arctic region at −20° C. or less, and serves as an engine device with high reliability and high safety.

An engine device according to a second aspect of the present disclosure may be configured such that a cross-sectional area of the part of the introduction space defined by the blow-by gas guide plate and expanding downstream of the blow-by gas inlet in the first aspect is larger than a cross-sectional area of the blow-by gas inlet, the cross-sectional areas being orthogonal to an introduction direction in which the blow-by gas flows. In the thus-configured engine device according to the second aspect of the present disclosure, the blow-by gas introduced from the blow-by gas inlet is guided to the part of the introduction space having a large cross-sectional area orthogonal to the flow, and thus, a phenomenon in which ice coating is generated on a pipe conduit in a portion where the blow-by gas is merged with intake air and blocks the pipe conduit can be prevented.

An engine device according to a third aspect of the present disclosure may be configured such that in an intake passage including the part of the introduction space defined by the blow-by gas guide plate and expanding downstream of the blow-by gas inlet in the second aspect, the part of the introduction space expanding downstream of the blow-by gas inlet occupies a region greater than or equal to 10% and less than or equal to 40% of an inner diameter of the intake passage. In the thus-configured engine device according to the third aspect of the present disclosure, even in use in an arctic region, for example, the blow-by gas introduced from the blow-by gas inlet is first guided to the introduction space having a large capacity and flows in parallel with intake air, and thus, rapid cooling of the blow-by gas can be prevented. As a result, it is possible to prevent a phenomenon in which ice coating is generated on a pipe conduit in a portion where the blow-by gas is merged with the intake air to block the pipe conduit.

In an engine device according to a fourth aspect of the present disclosure, the blow-by gas inlet in the second aspect may be configured such that the introduction direction of the blow-by gas is at a predetermined angle relative to a flat surface of the blow-by gas guide plate. In the thus-configured engine device according to the fourth aspect of the present disclosure, the blow-by gas introduced to the intake passage from the blow-by gas inlet is smoothly guided into the intake passage and flows in parallel with a flow of intake air.

In an engine device according to a fifth aspect of the present disclosure, the blow-by gas inlet in the second aspect may be configured such that the introduction direction of the blow-by gas is orthogonal to a flat surface of the blow-by gas guide plate. In the thus-configured engine device according to the fifth aspect of the present disclosure, a distance from the blow-by gas inlet to the flat surface in the introduction space of the intake passage can be increased so that a distance to a region where the blow-by gas introduced from the blow-by gas inlet is cooled by intake air flowing in the intake passage can be increased.

In an engine device according to a sixth aspect of the present disclosure, the blow-by gas guide plate in any one of the first through fifth aspects may have a heat insulating structure. In the thus-configured engine device according to the sixth aspect of the present disclosure, a phenomenon in which the blow-by gas introduced from the blow-by gas inlet is rapidly cooled by intake air in the introduction space can be reduced.

In an engine device according to a seventh aspect of the present disclosure, the blow-by gas guide plate in any one of the first through fifth aspects may include a heat insulator. In the thus-configured engine device according to the seventh aspect of the present disclosure, a phenomenon in which the blow-by gas introduced from the blow-by gas inlet is rapidly cooled by intake air in the introduction space can be reduced.

In an engine device according to an eighth aspect of the present disclosure, the blow-by gas guide plate in any one of the first through fifth aspects may have a heat insulating structure with a double wall. In the thus-configured engine device according to the eighth aspect of the present disclosure, a phenomenon in which the blow-by gas introduced from the blow-by gas inlet is rapidly cooled by intake air in the introduction space can be reduced.

In an engine device according to a ninth aspect of the present disclosure, the blow-by gas guide plate in any one of the first through fifth aspects may have a plurality of openings disposed downstream of the blow-by gas inlet. In the thus-configured engine device according to the ninth aspect of the present disclosure, the blow-by gas introduced from the blow-by gas inlet is gradually mixed with intake air in the introduction space so that rapid cooling can be reduced.

Embodiments of the present disclosure will be described hereinafter with reference to the accompanying drawings. Note that the configuration of the present invention is not limited to the following embodiments. An engine device according to an aspect of the present disclosure will be described using a diesel engine as an example in the following embodiments. The present disclosure, however, is not limited to a configuration of the diesel engine according to the embodiments, and includes an engine device configured based on a technical idea equivalent to a technical idea described in the embodiments.

First Embodiment

A diesel engine serving as an engine device according to a first embodiment of the present disclosure will be described with reference to the accompanying drawings. In the drawings, the direction indicated by arrow UP is an upward direction.

Figure 2:
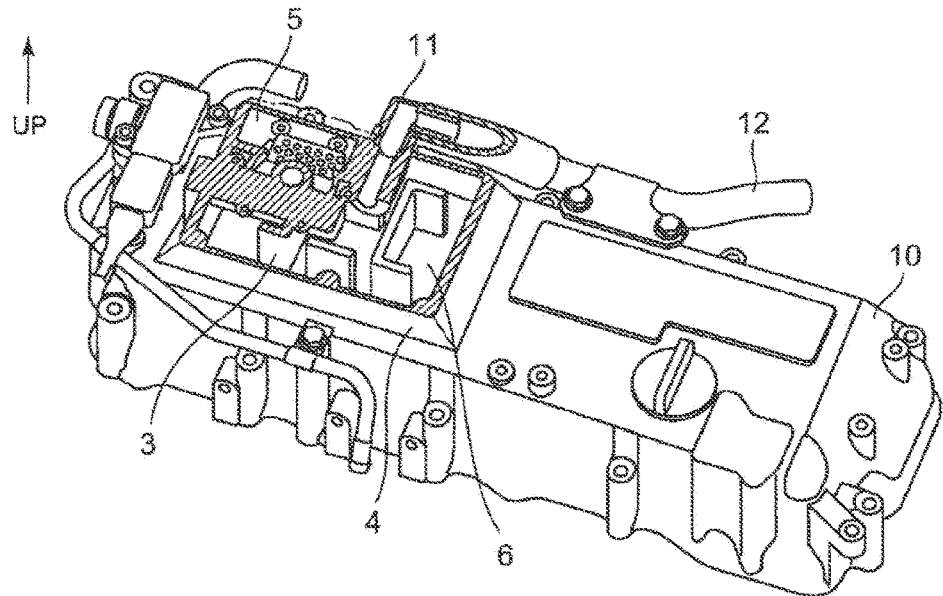
FIG. 2 illustrates a perspective view illustrating the vicinity of a head cover covering an upper surface of a cylinder head of the diesel engine according to the first embodiment.

FIG. 1 is a perspective view illustrating an entire configuration of the diesel engine according to the first embodiment of the present disclosure. FIG. 2 is a perspective view illustrating the vicinity of a head cover covering an upper surface of a cylinder head in the diesel engine according to the first embodiment, and partially shows the vicinity in cross section. The diesel engine 1 according to the first embodiment includes a continuous regeneration type exhaust gas purifier 2.

The diesel engine 1 according to the first embodiment includes a blow-by gas returning mechanism 3 (see FIG. 2) for returning a blow-by gas in a crank case that has leaked from a combustion chamber to an intake system (intake pipe). A head cover 10 covering, for example, an intake valve and an exhaust valve provided on the upper surface of a cylinder head of the diesel engine has a blow-by gas returning mechanism 3. The blow-by gas returning mechanism 3 includes a gas pressure regulation portion 4 formed by expanding a part of the upper surface of the head cover 10 upward. In the gas pressure regulation portion 4, a blow-by gas intake chamber 5 in which a blow-by gas that has leaked from, for example, the combustion chamber of the diesel engine 1 is taken, and a blow-by gas expansion chamber 6 to which the blow-by gas in the blow-by gas intake chamber 5 is supplied through a gas pressure regulation valve. The bottom surface of the blow-by gas expansion chamber 6 is provided with a check valve such as a plate spring that bends downward under the weight. When a lubricating oil component is accumulated in the blow-by gas expansion chamber 6, the check valve rotates under the weight of the lubricating oil component and causes the lubricating oil component to be dropped onto the upper surface of the cylinder head. In the configuration as described above, the lubricating oil component accumulated in the blow-by gas expansion chamber 6 falls on the upper surface of the cylinder head, and is collected in the diesel engine 1.

In the configuration of the first embodiment, since the lower surface of the blow-by gas expansion chamber 6 is provided with the check valve that is the plate spring, even when lubricating oil is spattered from the upper surface of the cylinder head toward the check valve, the spattered lubricating oil is not mixed in the blow-by gas expansion chamber 6.

The blow-by gas expansion chamber 6 includes a plurality of maze conduits defined by a plurality of partition plates, for example. The blow-by gas expansion chamber 6 has a configuration in which when a blow-by gas expands in the maze conduits, a lubricating oil component in the blow-by gas is thereby removed. The removed lubricating oil component is accumulated on the bottom surface of the blow-by gas expansion chamber 6, and under the weight of the accumulated lubricating oil component, the plate spring bends so that the lubricating oil component is dropped onto the upper surface of the cylinder head and is collected in the diesel engine.

On the other hand, the blow-by gas from which the lubricating oil component has been removed in the blow-by gas expansion chamber 6 is sent to a pipe conduit of an intake pipe 13 (see FIG. 3 described later) through a pipe conduit of a returning hose 12 (see FIG. 2) connected to an exhaust gas outlet 11 of the blow-by gas expansion chamber 6. The exhaust gas outlet 11 of the blow-by gas expansion chamber 6 is integrally formed with the head cover 10 and projects from the upper surface of the head cover 10.

Figure 3:
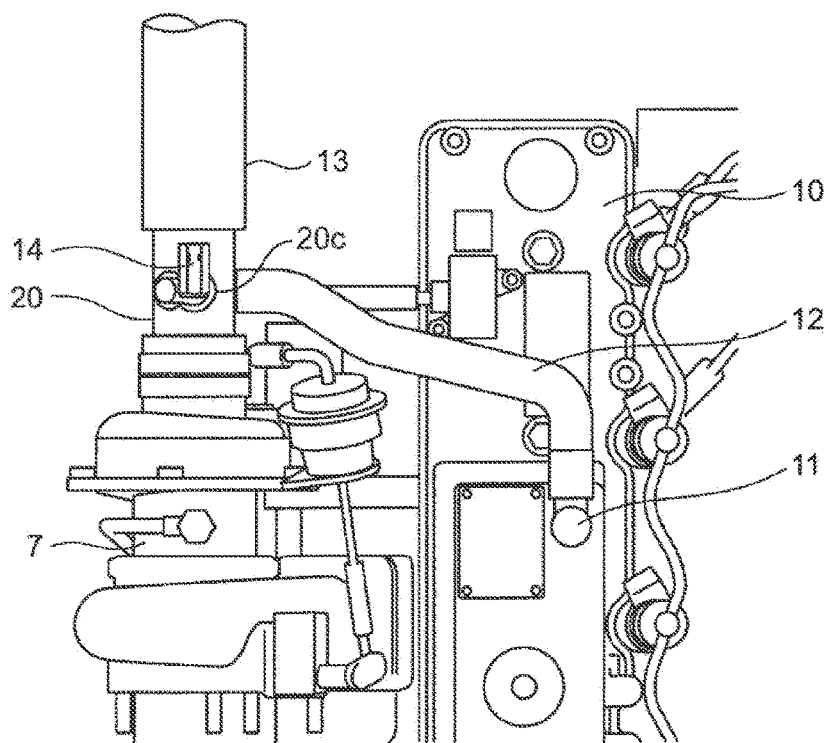
FIG. 3 illustrates a plan view illustrating a part of the diesel engine according to the first embodiment including the head cover when viewed from above.

FIG. 3 is a plan view partially illustrating the diesel engine 1 including the head cover 10 when viewed from above, and illustrates a state in which the exhaust gas outlet 11 of the blow-by gas expansion chamber 6 provided in the head cover 10 and the intake pipe 13 are connected together by the returning hose 12.

The intake pipe 13 illustrated in FIG. 3 is an intake pipe conduit in which intake air (outdoor air: fresh air) flows toward a supercharger (turbocharger) 7 through an air cleaner (not shown). In the intake pipe 13 illustrated in FIG. 3, intake air flows from the top to the bottom. The pipe conduit of the intake pipe 13 is provided with a blow-by gas mixed joint 20 configured to introduce a blow-by gas from the blow-by gas expansion chamber 6 in the head cover 10 into the intake pipe 13. The returning hose 12 connecting the blow-by gas mixed joint 20 connected to the intake pipe 13 and the exhaust gas outlet 11 of the blow-by gas expansion chamber 6 to each other is made of a flexible material having heat resistance and cold resistance, such as a rubber material.

(Configuration of Blow-by Gas Mixed Joint)

Figure 4:
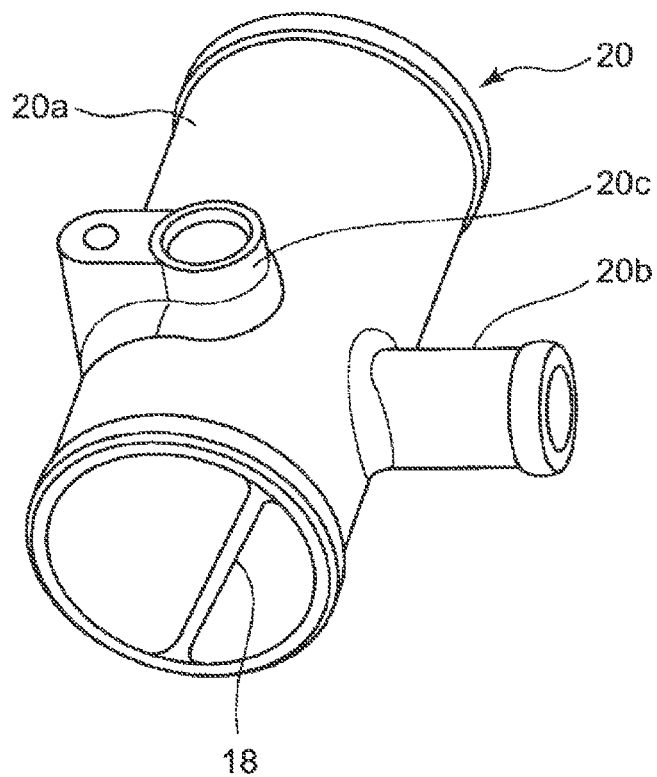
FIG. 4 illustrates a perspective view illustrating a blow-by gas mixed joint in the diesel engine according to the first embodiment.
Figure 5:
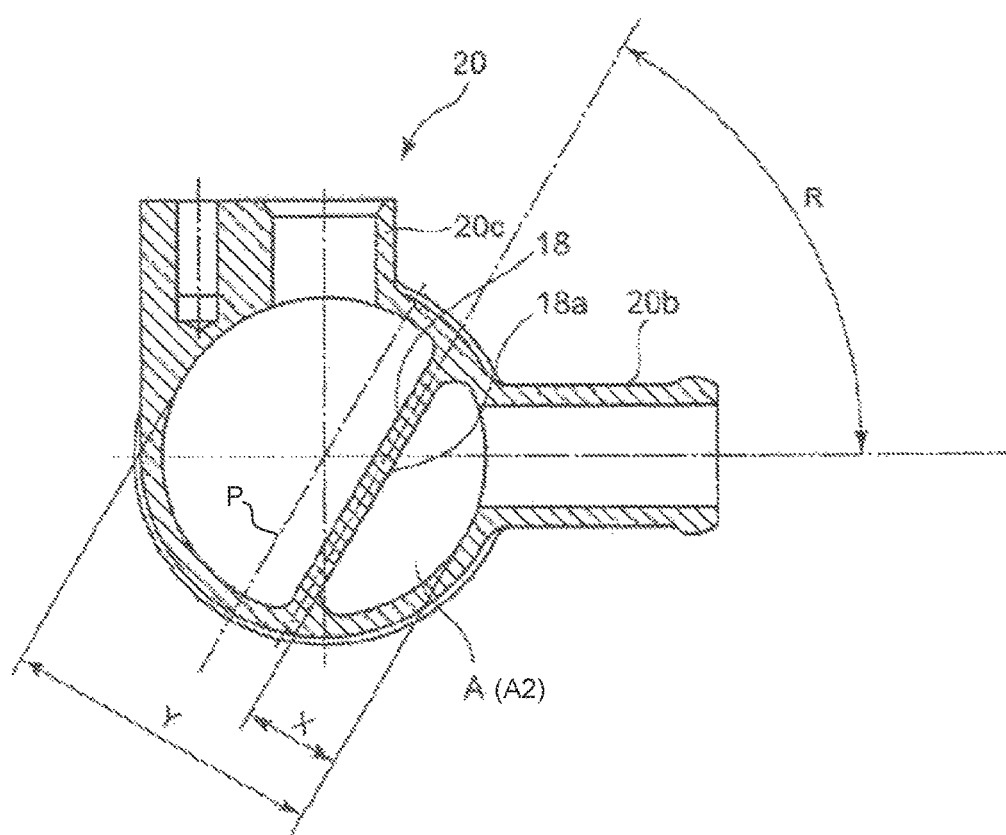
FIG. 5 illustrates a cross-sectional view of the blow-by gas mixed joint in the diesel engine according to the first embodiment taken along a line orthogonal to an airflow direction of intake air.
Figure 6:
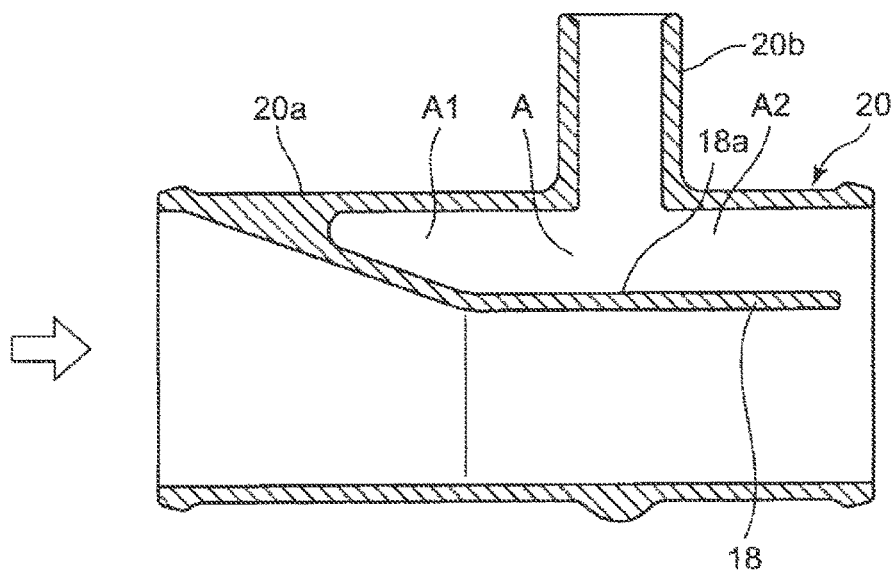
FIG. 6 illustrates a cross-sectional view of the blow-by gas mixed joint in the diesel engine according to the first embodiment taken along the airflow direction of intake air.

FIG. 4 is a perspective view illustrating the blow-by gas mixed joint 20. FIG. 5 is a cross-sectional view taken along a line orthogonal to an airflow direction of intake air in the blow-by gas mixed joint 20. FIG. 5 illustrates a cross section including the center of a blow-by gas inlet 20b (described later) to which the returning hose 12 having a circular cross section is joined. FIG. 6 is a cross-sectional view of the blow-by gas mixed joint 20 taken along the airflow direction of intake air (intake direction).

As illustrated in FIGS. 3 through 6, the blow-by gas mixed joint 20 has a three-way joint structure and is configured such that the blow-by gas inlet 20b is provided in an intake passage 20a communicating with the pipe conduit of the intake pipe 13. A blow-by gas guide plate 18 is disposed in the blow-by gas mixed joint 20. The blow-by gas guide plate 18 has the function of guiding a blow-by gas introduced from the blow-by gas inlet 20b so that the blow-by gas flows along the intake direction in the intake passage 20a.

In the diesel engine according to the first embodiment, the blow-by gas mixed joint 20 is provided with a temperature sensor 14 (see FIG. 3) that detects an intake air temperature in the intake passage 20a. The temperature sensor 14 is inserted in the direction orthogonal to the intake direction of the intake passage 20a, and is held by a sensor holding part 20c (see FIG. 4) extending outward from the outer peripheral surface of the intake passage 20a. In the configuration of the first embodiment, a holding plate (not shown) provided with the temperature sensor 14 is screwed to the sensor holding part 20c so as to securely hold the temperature sensor 14 on the sensor holding part 20c with the holding plate interposed therebetween.

In the configuration of the first embodiment, the temperature detection region of the temperature sensor 14 includes a plane orthogonal to the intake direction including a center line extending in the introduction direction of the blow-by gas inlet 20b. That is, the temperature sensor 14 is disposed near the blow-by gas inlet 20b of the blow-by gas mixed joint 20.

In the example of the first embodiment, the temperature sensor 14 is disposed near the blow-by gas inlet 20b as described above. Alternatively, the temperature sensor 14 may be disposed at a position offset upstream and/or downstream of the blow-by gas inlet 20b in the intake direction. In the configuration of the first embodiment, the introduction direction of the blow-by gas inlet 20b is orthogonal to the direction of disposing the temperature sensor 14 (insertion direction in the blow-by gas mixed joint 20: top-and-bottom direction in FIG. 5). This configuration can also be changed as appropriate depending on arrangement of parts in the diesel engine.

As illustrated in the cross-sectional view orthogonal to the intake direction in FIG. 5, a guide surface (flat surface 18a) of the blow-by gas guide plate 18 disposed in the blow-by gas mixed joint 20 tilts relative to the introduction direction of the blow-by gas inlet 20b (leftward in FIG. 5) at a predetermined angle (represented by character R in FIG. 5). In the configuration of the first embodiment, the flat surface 18a of the blow-by gas guide plate 18 tilts 60° relative to the introduction direction of the blow-by gas inlet 20b.

As illustrated in the cross-sectional view taken along the intake direction in FIG. 6, in a region upstream of the blow-by gas inlet 20b, the blow-by gas guide plate 18 in the blow-by gas mixed joint 20 tilts relative to the inner wall of the blow-by gas mixed joint 20 and gradually extends inward. The blow-by gas guide plate 18 (see FIG. 6) obliquely extending approximately in the intake direction from the inner wall of the blow-by gas mixed joint 20 extends to a predetermined distance along (in parallel with) the intake direction after having reached the length (see character X in FIG. 5) greater than or equal to 30% of the inner diameter (see character Y in FIG. 5) of the intake passage 20a of the blow-by gas mixed joint 20.

As illustrated in FIG. 6, in a region downstream of the blow-by gas inlet 20b, intake air (outdoor air) from an air cleaner and a blow-by gas that are separated from each other by the blow-by gas guide plate 18 flow to a predetermined direction in the same intake direction. That is, an introduction space A of a blow-by gas defined by the blow-by gas guide plate 18 is formed in the blow-by gas mixed joint 20. The introduction space A is divided into a first introduction space A1 upstream of the blow-by gas inlet 20b and a second introduction space A2 downstream of the blow-by gas inlet 20b. The first introduction space A1 is a space region that is located upstream of the blow-by gas inlet 20b and gradually expands until the cross-sectional shape thereof orthogonal to the intake direction reaches a predetermined size. In the second introduction space A2 located downstream of the blow-by gas inlet 20b, the cross-sectional shape orthogonal to the intake direction is maintained at the predetermined size, and a blow-by gas is separated from intake air and flows in parallel with the intake air. As described above, in the configuration of the first embodiment, the predetermined introduction space A (A1 and A2) is obtained upstream and downstream of the blow-by gas inlet 20b.

As illustrated in FIG. 6, the first introduction space A1 upstream of the blow-by gas inlet 20b has its upstream end closed, and thus, most part of a blow-by gas from the blow-by gas inlet 20b flows into the downstream second introduction space A2. Consequently, the first introduction space A1 is in a state where a certain amount of a blow-by gas remains, and has a configuration in which the intake air temperature, which is the temperature of intake air, is transferred to the blow-by gas in the introduction space A through the blow-by gas guide plate 18.

In a case where an apparatus including, as a power source, a diesel engine serving as an engine device is used in an arctic region (e.g., at an outdoor temperature of −20° C.), the intake air temperature (fresh air temperature) is, for example, −20° C. When intake air at such an intake air temperature is simply mixed with a blow-by gas in the crank case that has leaked from the combustion chamber, moisture contained in the blow-by gas is instantaneously frozen, and generates ice coating on a pipe conduit in a region where the intake air and the blow-by gas are mixed, resulting in a serious problem of blockage of the pipe conduit.

In a case where an apparatus including, as a power source, a diesel engine that is the engine device according to the first embodiment of the present disclosure is used in an arctic region, a blow-by gas is guided by the blow-by gas guide plate 18 with respect to intake air (e.g., at an outdoor temperature of −20° C.) in the blow-by gas mixed joint 20 and is gradually cooled. The blow-by gas mixed joint 20 is configured such that a blow-by gas that has flowed from the blow-by gas inlet 20b into the introduction space A is guided by the blow-by gas guide plate 18 to flow in parallel with intake air flowing in the intake passage 20a, and the blow-by gas is not rapidly mixed but is gradually mixed with the intake air. The supercharger 7 is connected to the intake pipe 13 communicating with the downstream side of the intake passage 20a, and intake air and a blow-by gas flowing in the intake passage 20a are sucked from the upstream side.

As described above, in the blow-by gas mixed joint 20 used in the diesel engine according to the first embodiment, the first introduction space A1 is defined upstream of the blow-by gas inlet 20b. Since a blow-by gas remains in the first introduction space A1, this remaining blow-by gas serves as a cushioning material related to heat transfer to the blow-by gas immediately after introduction from the blow-by gas inlet 20b. That is, the blow-by gas remaining in the first introduction space A1 serves as a heat insulator.

In the blow-by gas mixed joint 20, the blow-by gas guide plate 18 in the intake passage 20a is configured to have its upstream end gradually rise with a tilt relative to the inner wall of the intake passage 20a. Thus, in the intake passage 20a, the wall surface of the blow-by gas guide plate 18 smoothly guides a flow of intake air in the intake direction, and the blow-by gas introduced from the blow-by gas inlet 20b is gradually cooled. In this manner, in the intake passage 20a of the blow-by gas mixed joint 20, the blow-by gas flows in parallel with, and at a predetermined distance from, intake air with the blow-by gas guide plate 18 interposed therebetween to gradually exchange heat with the intake air, and then is mixed with the intake air. Accordingly, in a case where an apparatus including, as a power source, the diesel engine according to the first embodiment is used in an arctic region, it is possible to prevent a phenomenon in which moisture contained in the blow-by gas is instantaneously frozen to generate ice coating on a pipe conduit and block the pipe conduit in the blow-by gas inlet 20b of the blow-by gas mixed joint 20.

Although the first embodiment is directed to the case where the introduction direction of the blow-by gas inlet 20b of the blow-by gas mixed joint 20 is approximately a horizontal direction (see FIG. 5), the introduction direction of the blow-by gas inlet 20b can be changed as appropriate in accordance with arrangement of parts in the diesel engine. Specifically, the introduction direction of the blow-by gas inlet 20b may be at a predetermined angle relative to the horizontal direction, such as the vertical direction at 90° relative to the horizontal direction or a direction at 45° or 30° relative to the horizontal direction.

Figure 7:
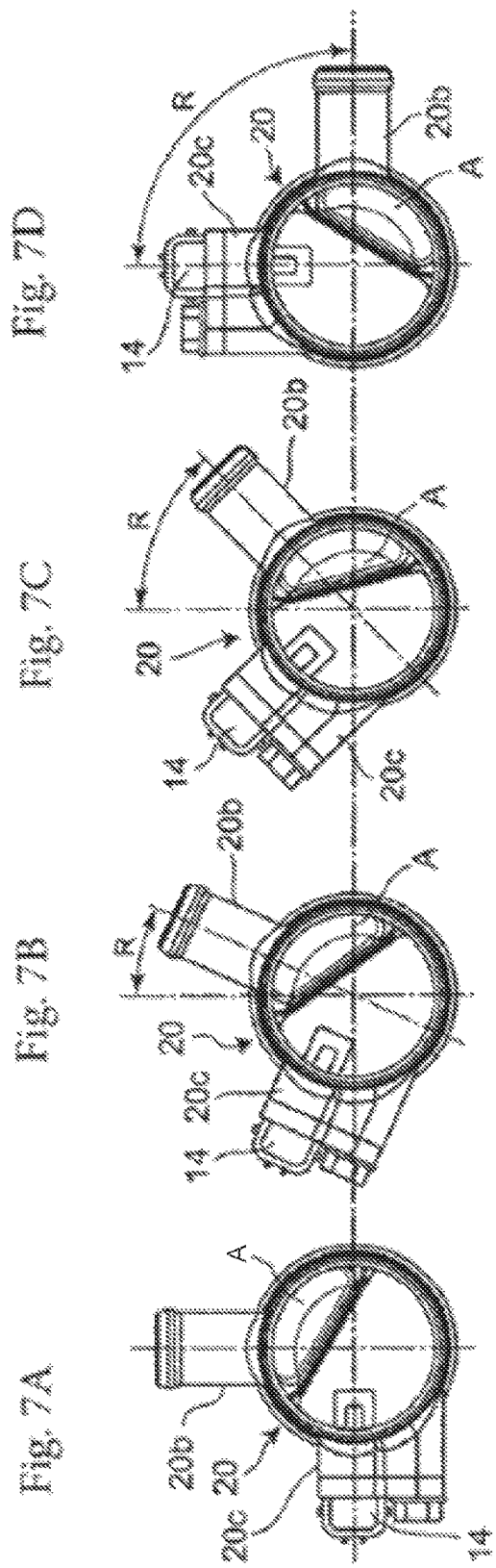
FIG. 7A, 7B, 7C, and FIG. 7D illustrate cross-sectional views illustrating various examples among which the introduction direction of a blow-by gas inlet of the blow-by gas mixed joint in the diesel engine according to the first embodiment is changed.

FIG. 7A through FIG. 7D illustrate various examples among which the introduction direction of the blow-by gas inlet 20b of the blow-by gas mixed joint 20 is changed, and show cross-sectional views orthogonal to the intake direction. FIG. 7A shows an example in which the introduction direction of the blow-by gas inlet 20b is at 0° relative to the vertical line, that is, a blow-by gas is introduced into the blow-by gas mixed joint 20 from vertically above. FIG. 7B shows an example in which the introduction direction of the blow-by gas inlet 20b is tilted 24° relative to the vertical line. FIG. 7C shows an example in which the introduction direction of the blow-by gas inlet 20b is tilted 45° relative to the vertical line. FIG. 7D shows an example in which the introduction direction of the blow-by gas inlet 20b is tilted 90° relative to the vertical line.

In a plane orthogonal to the intake direction of the intake passage 20a including the second introduction space A2 (see FIG. 5), a distance (see character X in FIG. 5) between the inner wall of the intake passage 20a in the center line (center line indicated as character P in FIG. 5) of the intake passage 20a and the blow-by gas guide plate 18 (flat surface 18a) is a length greater than or equal to 30% of the inner diameter of the intake passage 20a (see character Y in FIG. 5) in the configuration described above. The present disclosure, however, is not limited to this configuration. For example, similar advantages can be obtained as long as the distance X indicated in FIG. 5 is within the range from 10 to 40% of the inner diameter (distance Y) of the intake passage 20a. Specifically, in the intake passage 20a including the second introduction space A2 defined by the blow-by gas guide plate 18 and expanding downstream of the blow-by gas inlet 20b, when the second introduction space A2 occupies a region greater than or equal to 10% and less than or equal to 40% of the inner diameter of the intake passage 20a, a blow-by gas flows to a predetermined distance in parallel with intake air with the blow-by gas guide plate 18 interposed therebetween to gradually exchange heat with the intake air and then is mixed with the intake air in the intake passage 20a of the blow-by gas mixed joint 20.

The cross-sectional area of the second introduction space A2 orthogonal to the intake direction that is the direction in which the blow-by gas flows is preferably larger than the cross-sectional area of the blow-by gas inlet 20b orthogonal to the introduction direction that is the direction in which the blow-by gas flows. With this configuration, the blow-by gas can smoothly flow in the second introduction space A2, and it is possible to prevent a phenomenon in which moisture contained in the blow-by gas is frozen and generates ice coating on a pipe conduit in which the blow-by gas flows to block the pipe conduit in the blow-by gas inlet 20b of the blow-by gas mixed joint 20.

Second Embodiment

Next, a diesel engine as an engine device according to a second embodiment of the present disclosure will be described mainly with respect to aspects different from the first embodiment described above. The diesel engine of the second embodiment is different from that of the first embodiment in the configuration of the blow-by gas mixed joint, and the other part of the configuration is the same as that of the first embodiment. Thus, in the description of the second embodiment, components having the same functions, configurations, and advantages are denoted by the same reference characters as those in the first embodiment, and detailed description thereof will not be repeated.

Figure 8:
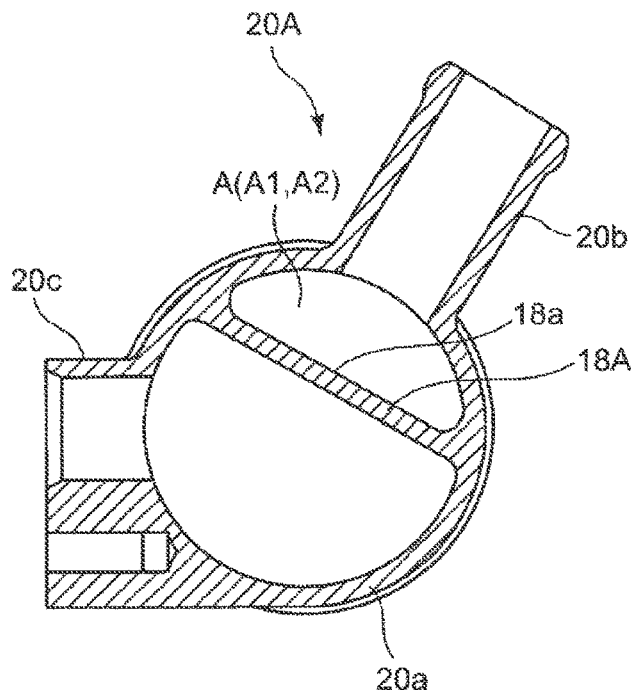
FIG. 8 illustrates a cross-sectional view of a blow-by gas mixed joint in a diesel engine according to a second embodiment of the present disclosure taken along a line orthogonal to an intake direction.

FIG. 8 is a cross-sectional view orthogonal to an intake direction of a blow-by gas mixed joint 20A in the diesel engine according to the second embodiment of the present disclosure. As illustrated in FIG. 8, an introduction direction of a blow-by gas inlet 20b in the blow-by gas mixed joint 20A is different from that in the configuration of the first embodiment described above.

The blow-by gas mixed joint 20A according to the second embodiment has a three-way joint structure in which the blow-by gas inlet 20b is disposed in an intake passage 20a, in a manner similar to the blow-by gas mixed joint 20 of the first embodiment. A blow-by gas guide plate 18A is disposed in the blow-by gas mixed joint 20A. The blow-by gas guide plate 18A has the function of guiding a blow-by gas introduced from the blow-by gas inlet 20b so that the blow-by gas flows along the intake direction in the intake passage 20a.

In the blow-by gas mixed joint 20A, a temperature sensor 14 (see FIG. 3) is disposed on a sensor holding part 20c and detects an intake air temperature in the intake passage 20a.

As illustrated in FIG. 8, in the blow-by gas mixed joint 20A, the introduction direction of a blow-by gas in the blow-by gas inlet 20b (obliquely downward from upper right to lower left in FIG. 8) is a direction orthogonal to a flat surface 18a of the blow-by gas guide plate 18A. In the second embodiment, the flat surface 18a of the blow-by gas guide plate 18A is tilted, for example, 30°, relative to a horizontal plane. Thus, the introduction direction of the blow-by gas in the blow-by gas inlet 20*b* is tilted 30° relative to the vertical direction. In the configuration of the second embodiment, a temperature sensor (not shown) held by the sensor holding part 20*c* is inserted approximately in the horizontal direction.

In the diesel engine according to the second embodiment having the configuration described above has advantages similar to those of the configuration of the first embodiment. Specifically, even in a case where an apparatus including a diesel engine as a power source is used in an arctic region, for example, a blow-by gas that has flowed from the blow-by gas inlet 20*b* into the introduction space A is guided by the blow-by gas guide plate 18A to flow in the same direction as intake air flowing in the intake passage 20*a* in the blow-by gas mixed joint 20A.

In a manner similar to the first embodiment described above, in the blow-by gas mixed joint 20A used in the diesel engine according to the second embodiment, an introduction space A (A1, A2) to which a blow-by gas is introduced from the blow-by gas inlet 20*b* also has a predetermined capacity. In addition, in the configuration of the second embodiment, the direction in which a blow-by gas is introduced from the blow-by gas inlet 20*b* is a direction orthogonal to the flat surface 18*a* of the blow-by gas guide plate 18A. Thus, a distance from an introduction end of the blow-by gas inlet 20*b* to the flat surface 18*a* of the blow-by gas guide plate 18A with which intake air contacts can be made uniform. Consequently, as compared to the configuration of the first embodiment, in the configuration of the diesel engine according to the second embodiment, the distance to a region in which the entire blow-by gas introduced from the blow-by gas inlet is cooled by intake air can be uniformly increased. As a result, in the case where an apparatus including the diesel engine according to the second embodiment as a power source is used in an arctic region, it is possible to prevent a phenomenon in which moisture contained in a blow-by gas is frozen to generate ice coating on a pipe conduit in which the blow-by gas flows to block the pipe conduit in the blow-by gas inlet 20*b* of the blow-by gas mixed joint 20A.

In the configuration of the second embodiment, as described for the configuration of the first embodiment, the introduction direction of the blow-by gas inlet 20*b* can also be changed as appropriate depending on arrangement of parts of the diesel engine.

Third Embodiment

Next, a diesel engine as an engine device according to a third embodiment of the present disclosure will be described mainly with respect to aspects different from the first embodiment described above. The diesel engine of the third embodiment is different from that of the first embodiment in the configuration of the blow-by gas mixed joint, especially a configuration of the blow-by gas guide plate. The other part of the configuration of the third embodiment is the same as that of the first embodiment. Thus, in the description of the third embodiment, components having the same functions, configurations, and advantages are denoted by the same reference characters as those in the first embodiment, and detailed description thereof will not be repeated.

Figure 9:
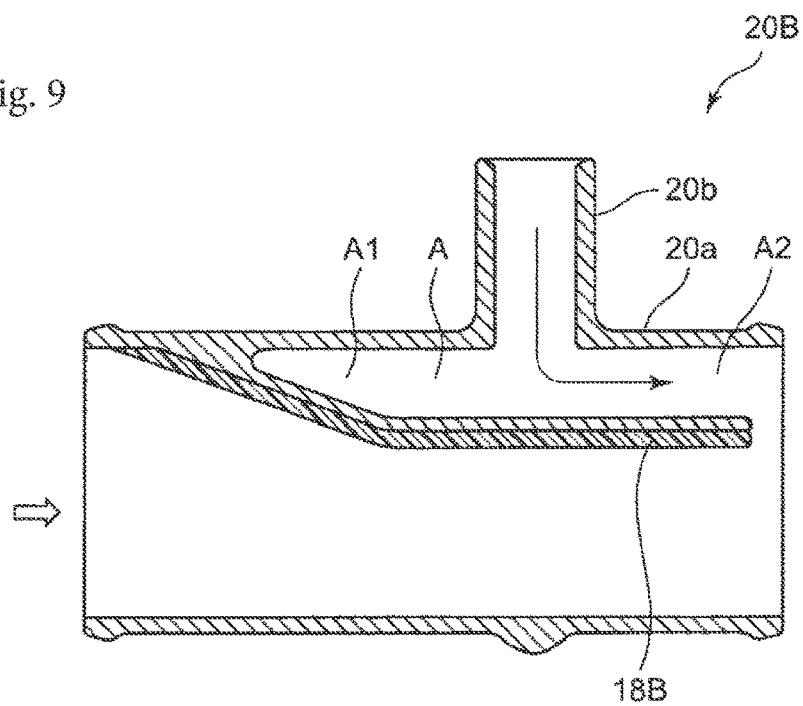
FIG. 9 illustrates a cross-sectional view of a blow-by gas mixed joint in a diesel engine according to a third embodiment of the present disclosure taken in parallel with an intake direction.

FIG. 9 is a cross-sectional view of a blow-by gas mixed joint 20B in a diesel engine according to the third embodiment of the present disclosure taken in parallel with the intake direction. As illustrated in FIG. 9, a configuration of a blow-by gas guide plate 18B of the blow-by gas mixed joint 20B is different from the configuration of the first embodiment.

In the blow-by gas guide plate 18B of the blow-by gas mixed joint 20B in the diesel engine according to the third embodiment, a heat insulator is bonded to a surface that contacts intake air. The heat insulator is, for example, a cold-resistant heat insulator such as silicone rubber. The blow-by gas mixed joint 20B is integrally processed by resin molding, and the heat insulator is bonded to a surface of the blow-by gas guide plate 18B facing intake side.

In a case where an apparatus including, as a power source, the diesel engine according to the third embodiment having the configuration described above is used in an arctic region, when a blow-by gas introduced from the blow-by gas inlet 20*b* of the blow-by gas mixed joint 20B contacts, and is guided by, the blow-by gas guide plate 18B, the temperature of intake air is insulated by the blow-by gas guide plate 18B. As a result, the configuration described above can ensure prevention of a phenomenon in which moisture contained in the blow-by gas is frozen to generate ice coating on a pipe conduit in which the blow-by gas flows and block the pipe conduit in the blow-by gas mixed joint 20B.

Fourth Embodiment

Now, a diesel engine as an engine device according to a fourth embodiment of the present disclosure will be described mainly with respect to aspects different from the first embodiment described above. The diesel engine according to the fourth embodiment is different from the configuration of the first embodiment in the configuration of the blow-by gas mixed joint, especially the configuration of the blow-by gas guide plate. The other part of the configuration of the fourth embodiment is the same as that of the first embodiment. Thus, in the description of the fourth embodiment, components having the same functions, configurations, and advantages are denoted by the same reference characters as those in the first embodiment, and detailed description thereof will not be repeated.

Figure 10:
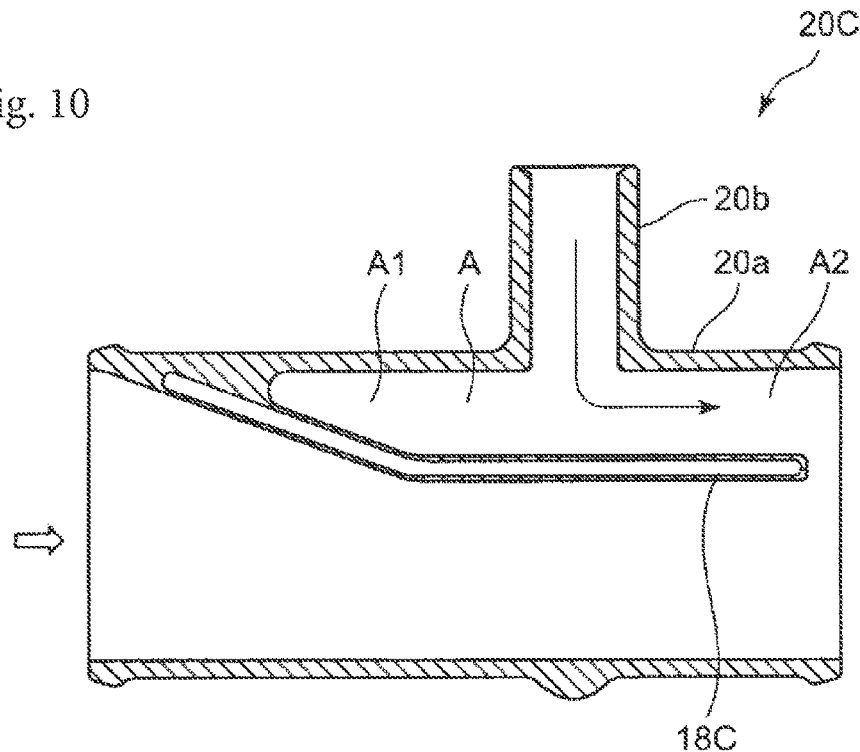
FIG. 10 illustrates a cross-sectional view of a blow-by gas mixed joint in a diesel engine according to a fourth embodiment of the present disclosure taken in parallel with an intake direction.

FIG. 10 is a cross-sectional view of a blow-by gas mixed joint 20C in a diesel engine according to the fourth embodiment of the present disclosure taken in parallel with the intake direction. As illustrated in FIG. 10, a configuration of a blow-by gas guide plate 18C of the blow-by gas mixed joint 20C is different from the configuration of the first embodiment.

The blow-by gas guide plate 18C of the blow-by gas mixed joint 20C in the diesel engine according to the fourth embodiment has a heat insulating structure with a double structure. The double structure of the blow-by gas guide plate 18C is a structure having a space therein. The blow-by gas mixed joint 20C according to the fourth embodiment is integrally formed by resin molding, and the blow-by gas mixed joint 20C can be easily fabricated with a high processing accuracy.

In a case where an apparatus including, as a power source, the diesel engine according to the fourth embodiment having the configuration described above is used in an arctic region, when a blow-by gas introduced from a blow-by gas inlet 20*b* of the blow-by gas mixed joint 20C contacts, and is guided by, the blow-by gas guide plate 18C having the heat insulating structure, the temperature of intake air is insulated by the blow-by gas guide plate 18C. As a result, the configuration described above can further prevent a phenomenon in which moisture contained in the blow-by gas is frozen to generate ice coating on a pipe conduit in which the blow-by gas flows and block the pipe conduit in the blow-by gas mixed joint 20C.

Fifth Embodiment

Now, a diesel engine as an engine device according to a fifth embodiment of the present disclosure will be described mainly with respect to aspects different from the first embodiment described above. The diesel engine according to the fifth embodiment is different from the configuration of the first embodiment in the configuration of the blow-by gas mixed joint, especially the configuration of the blow-by gas guide plate. The other part of the configuration of the fifth embodiment is the same as that of the first embodiment. Thus, in the description of the fifth embodiment, components having the same functions, configurations, and advantages are denoted by the same reference characters as those in the first embodiment, and description thereof will not be repeated.

Figure 11:
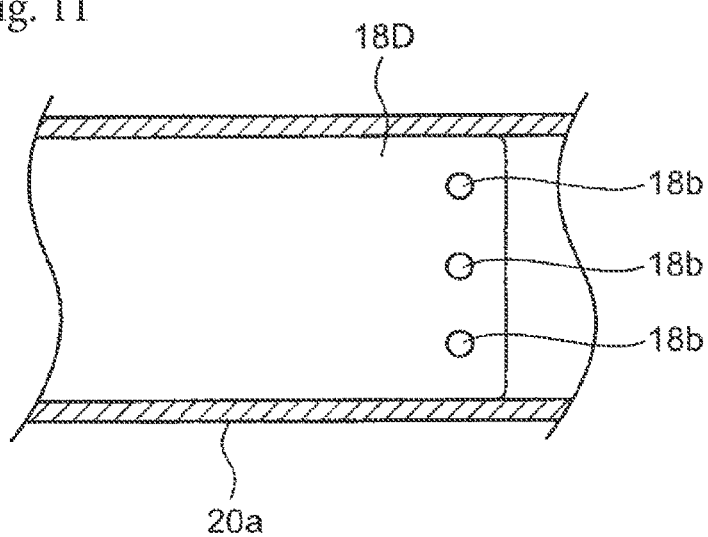
FIG. 11 illustrates a plan view illustrating a downstream end of a flat portion of a blow-by gas guide plate of a blow-by gas mixed joint in a diesel engine according to a fifth embodiment of the present disclosure.

FIG. 11 is a plan view illustrating a downstream end of a flat portion of a blow-by gas guide plate 18D formed in a blow-by gas mixed joint in the diesel engine according to the fifth embodiment of the present disclosure. As illustrated in FIG. 11, the blow-by gas guide plate 18D in the diesel engine according to the fifth embodiment has a plurality of openings (through holes) 18b near the downstream end of the flat portion thereof. The formation of these openings 18b near the downstream end of the blow-by gas guide plate 18D allows a blow-by gas introduced from a blow-by gas inlet 20b of the blow-by gas mixed joint to contact the blow-by gas guide plate 18D to be guided in the intake direction, and a part of the blow-by gas that has passed through the openings 18b near the downstream end of the blow-by gas guide plate 18D to be gradually mixed with intake air.

In a case where an apparatus including, as a power source, the diesel engine according to the fifth embodiment having the configuration described above is used in an arctic region, a blow-by gas introduced from the blow-by gas inlet 20b contacts, and is guided by, the blow-by gas guide plate 18D, and is gradually mixed with intake air. In this manner, in this configuration, since the blow-by gas is gradually mixed with intake air in the blow-by gas mixed joint, it is possible to further prevent a phenomenon in which moisture contained in the blow-by gas is instantaneously frozen to generate ice coating on a pipe conduit and block the pipe conduit.

As described above, the engine device according to an aspect of the present disclosure has a blow-by gas returning mechanism that returns a blow-blow-by gas in a crank case that has leaked from the combustion chamber to the intake system, and this blow-by gas returning mechanism uses the blow-by gas mixed joint having a special structure for returning the blow-by gas to an intake pipe. In this manner, the use of the blow-by gas mixed joint in the blow-by gas returning mechanism can ensure prevention of a phenomenon in which moisture contained in a blow-by gas is instantaneously frozen to generate ice coating on a pipe conduit and block the pipe conduit even in a case where the engine device according to an aspect of the present disclosure is used as a power source in a cold region or an arctic region, for example.

Any two or more of the configurations described in the foregoing embodiments may be combined as appropriate so that advantages of these configurations can be obtained.

Preferred embodiments of the disclosure are thus sufficiently described with reference to attached drawings. However, it is obvious for a person with ordinary skill in the art to which the present invention pertains that various modifications and changes are possible. Such modifications and changes, unless they depart from the scope of the present disclosure as set forth in claims attached hereto, shall be understood as to be encompassed by the present disclosure.

INDUSTRIAL APPLICABILITY

The present disclosure is applicable to an engine device such as a diesel engine that is mounted as a power source in various types of power equipment such as a working vehicle, an agricultural machine, an electric generator, and a refrigerator, and is especially useful for an engine device that is used in cold regions and arctic regions.

REFERENCE SIGNS LIST 1 diesel engine
2 exhaust gas purifier
3 blow-by gas returning mechanism
4 gas pressure regulation portion
5 blow-by gas intake chamber
6 blow-by gas expansion chamber
7 supercharger (turbocharger)
10 head cover
11 exhaust gas outlet of blow-by gas expansion chamber
12 returning hose
13 intake pipe
14 temperature sensor
18, 18A, 18B, 18C, 18D blow-by gas guide plate
18a flat surface
18b opening
20, 20A, 20B, 20C blow-by gas mixed joint
20a intake passage
20b blow-by gas inlet
20c sensor holding part
A introduction space
A1 first introduction space
A2 second introduction space

The invention claimed is:
1. An engine device having a blow-by gas returning mechanism configured to return a blow-by gas having leaked from a combustion chamber to an intake pipe configured to enable intake air to flow there through, the engine device comprising:
a returning hose configured to receive the blow-by gas from the combustion chamber; and
a blow-by gas mixed joint configured to introduce the blow-by gas from the returning hose to the intake pipe, the blow-by gas mixed joint comprises:
an intake passage disposed on the intake pipe;
a blow-by gas inlet configured to introduce the blow-by gas into the intake pipe; and
a blow-by gas guide plate that defines an introduction space expanding upstream and downstream of the blow-by gas inlet in an intake direction of the intake passage; and
wherein:
the blow-by gas guide plate comprises:
a first portion having a first surface that intersects with an inner wall of the blow-by gas mixed joint, the first portion positioned in a region upstream of the blow-by gas inlet and is coupled to the inner wall to close an upstream end of a first portion of the introduction space upstream of the blow-by gas inlet; and a second portion having a second surface that comprises a downstream end positioned downstream of the blow-by gas inlet in the intake passage and an upstream end that intersects the first portion, wherein a first intersection of the second portion and the inner wall is parallel with a second intersection of the second portion and the inner wall; and the blow-by gas guide plate is configured to guide the blow-by gas introduced from the blow-by gas inlet in the intake direction toward an opening of the introduction space associated with the downstream end of the second portion.

2. The engine device according to claim 1, wherein a cross-sectional area of a second portion of the introduction space defined by the blow-by gas guide plate and expanding downstream of the blow-by gas inlet is larger than a cross-sectional area of the blow-by gas inlet, the cross-sectional areas being orthogonal to an introduction direction in which the blow-by gas flows from the blow-by gas inlet into the introduction space.

3. The engine device according to claim 2, wherein in an intake passage including the second portion of the introduction space defined by the blow-by gas guide plate and expanding downstream of the blow-by gas inlet, the second portion of the introduction space expanding downstream of the blow-by gas inlet occupies a region greater than or equal to 10% and less than or equal to 40% of an inner diameter of the intake passage.

4. The engine device according to claim 2, wherein the blow-by gas inlet is configured such that the introduction direction of the blow-by gas from the blow-by gas inlet into the introduction space is at a predetermined angle relative to the second surface of the blow-by gas guide plate.

5. The engine device according to claim 2, wherein the blow-by gas inlet is configured such that the introduction direction of the blow-by gas is orthogonal to the second surface of the blow-by gas guide plate.

6. The engine device according to claim 1, wherein the blow-by gas guide plate has a heat insulating structure.

7. The engine device according to claim 1, wherein the blow-by gas guide plate includes a heat insulator.

8. The engine device according to claim 1, wherein the blow-by gas guide plate has a heat insulating structure with a double wall.

9. The engine device according to claim 1, wherein the blow-by gas guide plate has a plurality of openings disposed downstream of the blow-by gas inlet.

10. The engine device according to claim 1, wherein:
the length of a first end of the second portion between a first side of the inner wall and a second side of the inner wall is the same as the length of a second end of the second portion between the first side of the inner wall and the second side of the inner wall;
the intake pipe has a diameter; and
the diameter is greater than the length of the first end of the second portion.

11. The engine device according to claim 1, wherein the first surface is planar and the second surface is planar.

12. The engine device according to claim 1, further comprising a heat insulator coupled to the blow-by gas guide plate, the blow-by gas guide plate positioned between the heat insulator and the blow-by gas inlet.

13. The engine device according to claim 1, wherein the blow-by gas guide plate is configured to guide the blow-by gas to a predetermined distance so that the blow-by gas within the introduction space is separated from intake air flowing in the intake passage and flows in parallel with the intake air.

14. The engine device according to claim 1, wherein the opening is defined by the inner wall and the downstream end of the second portion of the blow-by gas guide plate.

15. The engine device according to claim 14, wherein:
the blow-by gas mixed joint comprises:
an upstream opening defined by the inner wall; and
a downstream opening defined by the inner wall;
first portion positioned between the upstream opening and the blow-by gas inlet; and
the opening defined by the inner wall and the downstream end positioned between the blow-by gas inlet and the downstream opening.

16. The engine device according to claim 1, wherein the blow-by gas inlet is configured such that an introduction direction of the blow-by gas from the blow-by gas inlet into the introduction space is orthogonal to the second surface of the blow-by gas guide plate.

17. A blow-by gas mixed joint for an engine device, the blow-by gas mixed joint comprising: an intake pipe comprising an inner wall having an upstream end and a downstream end, the inner wall defining an intake passage between the upstream end and the downstream end, the intake passage associated with an intake direction from the upstream end to the downstream end; a blow-by gas inlet configured to be coupled to a return hose and to introduce blow-by gas received via the return hose into the intake pipe; and a blow-by gas guide plate that defines an introduction space expanding upstream and downstream of the blow-by gas inlet in an intake direction of the intake passage, the blow-by gas guide plate comprises: a first portion having a first surface that intersects with an inner wall of the blow-by gas mixed joint, the first portion positioned in a region upstream of the blow-by gas inlet and is coupled to the inner wall to close a first end of a first portion of the introduction space upstream of the blow-by gas inlet; and a second portion having a second surface that comprises a first end positioned downstream of the blow-by gas inlet in the intake passage and a second end that intersects the first portion, wherein a first intersection of the second portion and the inner wall is parallel with a second intersection of the second portion and the inner wall.

18. The blow-by gas mixed joint according to claim 17, the blow-by gas guide plate is configured to guide, in the intake direction, the blow-by gas introduced from the blow-by gas inlet toward an opening of the introduction space associated with the downstream end of the intake pipe.

19. A blow-by gas mixed joint for an engine device, the blow-by gas mixed joint comprising: an inner wall having an upstream end and a downstream end, the inner wall defining an intake passage between the upstream end and the downstream end, the intake passage associated with an intake direction from the upstream end to the downstream end; a blow-by gas inlet configured to be coupled to a return hose and to introduce blow-by gas received via the return hose into the intake pipe; and a blow-by gas guide plate that defines an introduction space expanding upstream and downstream of the blow-by gas inlet in an intake direction of the intake passage, the blow-by gas guide plate comprises: a first portion having a first surface that intersects with an inner wall of the blow-by gas mixed joint, the first portion positioned in a region upstream of the blow-by gas inlet and is coupled to the inner wall to close a first end of a first portion of the introduction space upstream of the blow-by gas inlet; a second portion having a second surface that comprises a first end positioned downstream of the blow-by gas inlet in the intake passage and a second end that intersects the first portion, wherein the length of the first end of the second portion between a first side of the inner wall and a second side of the inner wall is the same as the length of the second end of the second portion between the first side of the inner wall and the second side of the inner wall; and wherein a first intersection of the second portion and the inner wall is parallel with a second intersection of the second portion and the inner wall.

20. The blow-by gas mixed joint to claim 19, wherein: an intersection of the first portion and the inner wall extends between an upstream end of the first intersection of the second portion and the inner wall and an upstream end of the second intersection of the second portion and the inner wall.

* * * * *